(12) United States Patent
Burgess et al.

(10) Patent No.: US 11,492,991 B2
(45) Date of Patent: Nov. 8, 2022

(54) METHOD FOR OPERATING AN INTERNAL COMBUSTION ENGINE

(71) Applicant: Perkins Engines Company Limited, Peterborough (GB)

(72) Inventors: Chris Burgess, Peterborough (GB); Kane Lok, Peterborough (GB); Ben Icenhower, Woodland Park, CO (US)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 17/292,650

(22) PCT Filed: Nov. 7, 2019

(86) PCT No.: PCT/EP2019/025392
§ 371 (c)(1),
(2) Date: May 10, 2021

(87) PCT Pub. No.: WO2020/094257
PCT Pub. Date: May 14, 2020

(65) Prior Publication Data
US 2022/0010746 A1    Jan. 13, 2022

(30) Foreign Application Priority Data
Nov. 9, 2018 (GB) .................................... 1818254

(51) Int. Cl.
*F02D 41/14* (2006.01)
*F02D 41/00* (2006.01)
*F02D 41/38* (2006.01)

(52) U.S. Cl.
CPC ..... *F02D 41/1444* (2013.01); *F02D 41/0002* (2013.01); *F02D 41/38* (2013.01);
(Continued)

(58) Field of Classification Search
CPC ........ F02D 41/00; F02D 41/002; F02D 41/14; F02D 41/1444; F02D 41/38;
(Continued)

(56) References Cited

U.S. PATENT DOCUMENTS

| 4,665,883 A | 5/1987 | Amano et al. |
| 5,150,680 A | 9/1992 | Nishimura |

(Continued)

FOREIGN PATENT DOCUMENTS

| EP | 1460251 A2 | 9/2004 |
| EP | 2290210 B1 | 9/2012 |

(Continued)

OTHER PUBLICATIONS

International Search Report related to Application No. PCT/EP2019/025392; dated Feb. 13, 2020.

(Continued)

*Primary Examiner* — John Kwon
*Assistant Examiner* — Johnny H Hoang

(57) ABSTRACT

The present invention refers to a method for operating an internal combustion engine in a transition operating mode, comprising the steps of determining an initial fuel oxidizer ratio threshold and a demanded fuel oxidizer ratio for a fuel mixture to be supplied to a combustion chamber of the engine. If the demanded fuel oxidizer ratio exceeds the initial fuel oxidizer ratio threshold, the engine is temporally operated in a raised response mode, in which a fuel oxidizer ratio threshold is increased from the initial fuel oxidizer ratio threshold to a raised fuel oxidizer ratio threshold, and a fuel mixture having the demanded fuel oxidizer ratio is supplied into the combustion chamber of the engine.

9 Claims, 2 Drawing Sheets

(52) U.S. Cl.
CPC .................. *F02D 2041/389* (2013.01); *F02D 2200/0614* (2013.01); *F02D 2200/101* (2013.01); *F02D 2200/1002* (2013.01)

(58) Field of Classification Search
CPC ..... F02D 2200/0641; F02D 2200/1002; F02D 2200/101; F02D 2041/389
USPC .......... 123/429, 434; 701/101–105, 114, 115
See application file for complete search history.

(56) References Cited

U.S. PATENT DOCUMENTS

| | | |
|---|---|---|
| 6,612,291 B2 | 9/2003 | Sakamoto |
| 7,063,076 B1 | 6/2006 | Sun |
| 9,121,363 B2 | 9/2015 | Cattani et al. |
| 10,989,129 B1* | 4/2021 | Glugla ................ F02D 41/0002 |
| 2011/0192146 A1* | 8/2011 | Sugimoto ........... F02D 41/1495 60/276 |
| 2015/0152803 A1 | 6/2015 | Telborn |
| 2017/0159615 A1* | 6/2017 | Singh ..................... F02M 25/00 |

FOREIGN PATENT DOCUMENTS

| | | |
|---|---|---|
| EP | 3093470 A | 11/2016 |
| EP | 3121408 A1 | 1/2017 |
| EP | 3115580 A1 | 11/2017 |
| FR | 2846051 A1 | 4/2004 |
| JP | S63150441 A | 6/1988 |
| JP | S6441636 A | 2/1989 |
| WO | 2010139880 A2 | 12/2010 |

OTHER PUBLICATIONS

Great Britain Search Report related to Application No. 1818254.3: dated Apr. 26, 2019.

* cited by examiner

METHOD FOR OPERATING AN INTERNAL COMBUSTION ENGINE

CROSS-REFERENCE TO RELATED APPLICATION

This Application is a 35 USC § 371 US National Stage filing of International Application No. PCT/EP2019/025392 filed on Nov. 7, 2019 which claims priority under the Paris Convention to Great Britain Patent Application No. 1818254.3 filed on Nov. 9, 2018.

TECHNICAL FIELD

The present invention refers to a method for operating an internal combustion engine in a transition or a transient operating mode. Further, the invention relates to a fuel and intake air supply control device for an internal combustion engine for carrying out the method.

TECHNOLOGICAL BACKGROUND

In internal combustion engines, such as diesel engines, a fuel mixture comprising a fuel medium and an oxidizer, i.e. oxygen typically contained in intake air, are supplied to and ignited in a combustion chamber so as to produce high-temperature and high-pressure gases which apply forces to and thus move a piston or other components of the engine. In this way, the chemical energy is transformed into the mechanical energy. The combustion within the combustion chamber and thus the power and performance of the engine depend on characteristics of the fuel mixture, such as type and composition of its components.

To prevent the generation of an excessive amount of soot within an exhaust gas of the engine expelled from the combustion chamber, the amount or quantity of fuel relative to the amount or quantity of oxidizer in the fuel mixture to be supplied into the combustion chamber is usually limited during an operation of the engine. For that reason, a fuel and air supply control device of the engine, which is configured to selectively inject or supply the fuel medium and the oxidizer, i.e. intake air, into the combustion chamber, may be provided with a fuel oxidizer ratio threshold, i.e. a fuel air ratio threshold so as to limit the amount or quantity of fuel medium relative to the amount or quantity of oxidizer within the fuel mixture. However, by limiting the fuel oxidizer ratio of the fuel mixture, the power of the engine may also be limited.

During combustion of the fuel mixture, high temperatures in the combustion chamber may cause the generation of nitrogen oxides ($NO_x$) which is a major driver of air pollution by contributing to, for example, the formation of smog and acid rain. In internal combustion engines, exhaust gas recirculation techniques are known for reducing the amount or quantity of nitrogen oxides in the exhaust gas of the engine. Specifically, according to these techniques, a portion of the engine's exhaust gas is recirculated into the combustion chamber, thereby constituting a part of the fuel mixture. In this way, the amount or quantity of gases inert to combustion is increased in the combustion chamber which act as absorbents of combustion heat, thereby reducing peak temperatures in the combustion chamber and thus the generation of nitrogen oxides.

The recirculation of exhaust gas may cause a decrease of engine power. It is thus known to reduce the amount of exhaust gas to be recirculated into the combustion chamber during operating modes of the engine in which an increased engine power is required, e.g. during an acceleration of the engine speed.

Further, from EP 1 460 251 A2 it is known to determine the amount of oxygen in the recirculating exhaust gas, in dependence on which an exhaust gas recirculation (EGR) smoke limit correction value is calculated. The EGR smoke limit correction value is used to set a final smoke limit fuel injection amount or quantity by increasing the smoke limit fuel injection amount or quantity. In this way, acceleration power may be improved without decreasing an amount of recirculated exhaust gas while suppressing the generation of smoke.

Usually, the power of such internal combustion engines is still limited due to the overall fuel-air-ratio limit which is to be met during operation. During acceleration of an engine, a demand for an increased engine power may occur which has to be provided in a short response time. However, by known configurations and techniques for operating an internal combustion engine, this demand may not be met.

SUMMARY OF THE INVENTION

In view of the prior art, it is an objective to provide an improved method for operating an internal combustion engine which allows to increase engine power at a short response time, i.e. starting from a state, in which the engine is operated at low load. Further, a fuel and intake air supply control device for an internal combustion engine should be provided for carrying out the method.

This is solved by means of a method for operating an internal combustion engine with the features of claim 1 as well as a fuel and intake air supply control device for an internal combustion engine with the features of claim 10. Preferred embodiments are set forth in the present specification, the Figures as well as the dependent claims.

Accordingly, a method for operating an internal combustion engine in a transition operating mode is provided. The method comprises the step of determining an initial fuel oxidizer ratio threshold for a fuel mixture to be supplied to a combustion chamber of the engine, the step of determining a raised fuel oxidizer ratio threshold for a fuel mixture to be supplied to a combustion chamber of the engine and the step of determining a demanded fuel oxidizer ratio of the fuel mixture to be supplied to the combustion chamber of the engine. If the demanded fuel oxidizer ratio exceeds the initial fuel oxidizer ratio threshold, the engine is temporally operated in a raised response mode, in which a fuel oxidizer ratio threshold is increased from the initial fuel oxidizer ratio threshold to a raised fuel oxidizer ratio threshold, and a fuel mixture having the demanded fuel oxidizer ratio is supplied into the combustion chamber of the engine.

Furthermore, a fuel and intake air supply control device for an internal combustion engine is provided for controlling the supply of a fuel mixture into a combustion chamber of the engine. The fuel and intake air supply control device may particularly be used for carrying out the method for operating an internal combustion engine in a transition operating mode. Accordingly, technical features which are described in connection with the method may also relate and be applied to the proposed fuel and intake air supply control device, and vice versa.

The fuel and intake air supply control device comprises a first means for determining an initial fuel oxidizer ratio threshold for a fuel mixture to be supplied to a combustion chamber of the engine and a second means for determining a demanded fuel oxidizer ratio of the fuel mixture to be supplied to the combustion chamber of the engine. Further, the fuel and intake air supply control device is configured to, if the demanded fuel oxidizer ratio exceeds the initial fuel oxidizer ratio threshold, temporally operate the engine in a raised response mode, in which a fuel oxidizer ratio threshold is increased from the initial fuel oxidizer ratio threshold to an raised fuel oxidizer ratio threshold, and to supply a fuel mixture having the demanded fuel oxidizer ratio into the combustion chamber of the engine.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

In the following, the invention will be explained in more detail with reference to the accompanying Figures.

Figure 1:
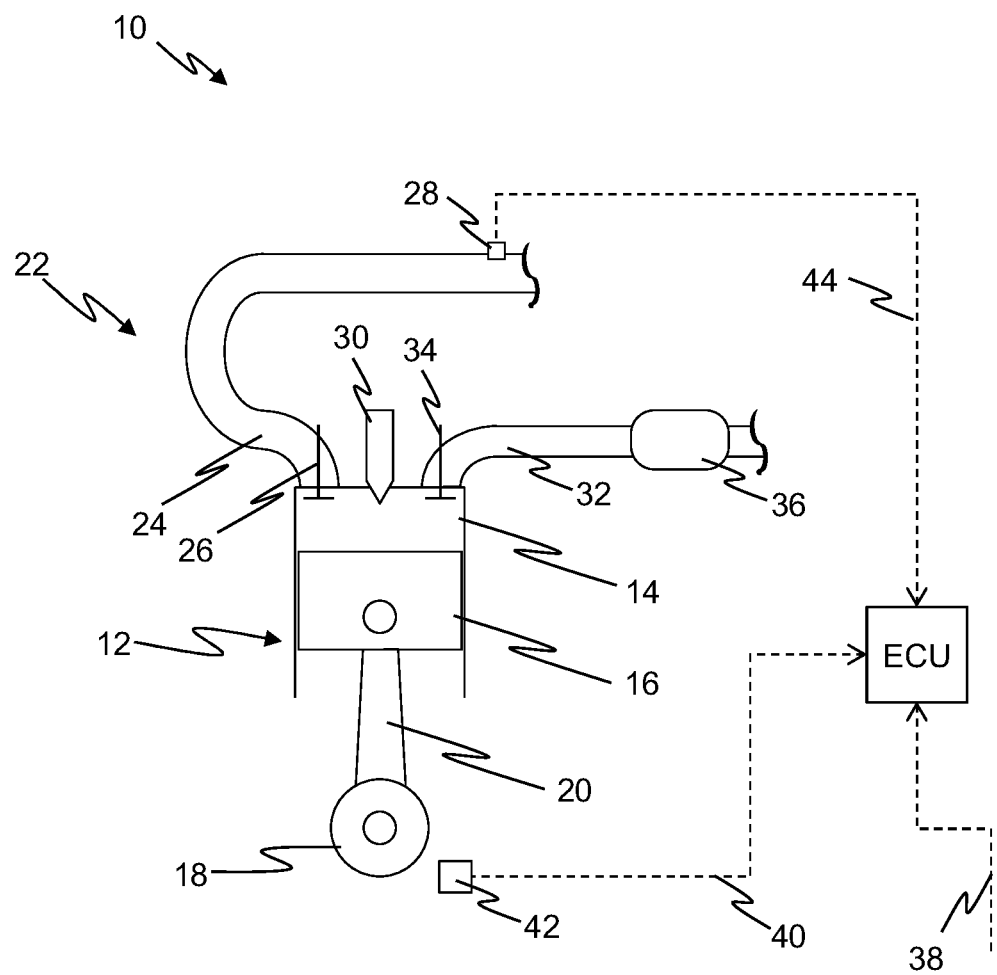
FIG. 1 schematically shows an internal combustion engine with a fuel and intake air supply control device.

FIG. 1 schematically shows an internal combustion engine 10, also referred to as engine in the following, provided in the form of a diesel engine which is installed on a vehicle (not shown). Specifically, the engine 10 comprises at least one cylinder 12, more specifically a plurality of cylinders, such as four, six, eight, twelve or eighteen cylinders. Each cylinder 12 is provided with a combustion chamber 14 delimited by a piston 16 which is accommodated in the cylinder 12. The piston 16 is configured for reciprocating and axial movement within the cylinder 12 and is connected to a crankshaft 18 of the engine 10 via a connecting rod 20.

The engine 10 further comprises a fuel and intake air supply control device 22, also referred to as control device 22 in the following, which is configured to control a supply of a demanded fuel mixture into the combustion chamber 14. The fuel mixture is ignited in the combustion chamber 14 so as to produce high-temperature and high-pressure gases which apply forces to and thus axially move the piston 16, thereby rotating the crankshaft 18. In this way, chemical energy is transformed into mechanical energy.

The fuel mixture is formed by mixing a fuel medium, i.e. diesel fuel, with intake air, i.e. fresh air from outside the vehicle, within the combustion chamber 14. For doing so, the control device 22, for each cylinder 12, comprises an intake air line 24 for guiding intake air into the combustion chamber 14, wherein the supply of intake air into the combustion chamber 14 is controlled by means of an intake air valve 26. For adjusting the amount or quantity of intake air to be supplied into the combustion chamber 14, a turbocharger boost control may be provided. Further, i.e. in thermal modes, exhaust and/or intake throttle valves may be provided so as to further control the flow of intake air into and/or of exhaust gases from the combustion chamber 14. An intake air sensor 28 is provided in the air intake line 24 which is configured to sense a temperature and a pressure of intake air guided through the intake air line 24. Further, the intake air sensor 28 may be configured to determine a mass flow of intake air supplied into the combustion chamber.

Further, for supplying the fuel medium into the combustion chamber 14 of each cylinder 12, the control device 22 comprises a fuel injection valve 30 configured to variedly inject the fuel medium into the combustion chamber 14.

The combustion chamber 14 of each cylinder 12 is connected to an exhaust gas line 32 for expelling combustion gases from the combustion chamber 14, i.e. after combustion of the fuel mixture took place. For controlling the expelling of combustion gases, an exhaust gas valve 34 is provided which variedly opens and closes an aperture of the exhaust gas line 32 opening into the combustion chamber 14.

Further, downstream of the exhaust gas valve 34, a particulate filter 36 is provided which purifies the exhaust gas discharged from the combustion chamber 14. In other words, the particulate filter 36 is configured to remove particulates, such as soot, from the exhaust gas. Specifically, the particulate filter 36 is a diesel particulate filter. Further, the particulate filter 36 is designed to periodically or continuously burn off particulates removed from the exhaust gas and accumulated therein. The process of burning off accumulated particulates is known as filter regeneration. This may be achieved by the use of a catalyst or by an active means, such as a fuel burner, which heats the particulate filter 36 to temperatures enabling soot combustion.

For controlling the operation of the engine 10, the control device 22 comprises an electronic control unit, also referred to as ECU in the following. Specifically, the ECU controls the operation of the engine 10 based on a control signal 38. The control signal 38 is indicative of a demanded engine power or demanded load at which the engine 10 is to be operated. For example, the control signal 38 may be indicative of a demanded torque or demanded rotational speed of the engine 10. Based on the control signal 38, the control device 22 controls the actuation of the intake air valve 26, the fuel injection valve 30 and the exhaust gas valve 34 so as to set an amount or a quantity and a composition of the fuel mixture to be supplied into and ignited in the combustion chamber 14, thereby adjusting the power output by the engine 10.

The control signal 38 received by the ECU may be provided by an operator interface device, such as a gas pedal, via which an operator may adjust a demanded engine power, i.e. increase or decrease a demanded torque and/or rotational speed of the engine 10.

For example, the control signal 38 may indicate whether engine power, i.e. torque generated by the engine 10 and/or rotational speed of the engine 10, is to be increased, decreased or maintained. Further, the control signal 38 may indicate at which response time a demanded engine power level is to be set or met. In other words, the control signal 38 may indicate how quickly the demanded engine power level is to be adjusted. In this configuration, the ECU is configured to process the control signal 38 so as to adjust the combustion process. Specifically, based on the control signal 38, the ECU is configured to determine a demanded amount or quantity and/or a demanded fuel oxidizer ratio dFOR and/or a fuel air ratio dFAR of the fuel mixture to be supplied into the combustion chamber 14.

Generally, in the context of the present disclosure, "a fuel oxidizer ratio" FOR of the fuel mixture to be supplied to the combustion chamber 14 refers to a mass ratio of fuel medium relative to an oxidizer:

$$FOR = \frac{m_{fuel}}{m_{oxidizer}}, \qquad (1)$$

wherein $m_{fuel}$ indicates a mass of fuel medium in the fuel mixture and $m_{oxidizer}$ indicates a mass of the oxidizer, i.e. oxygen, in the fuel mixture.

Accordingly, a fuel air ratio FAR of the fuel mixture to be supplied to the combustion chamber 14 refers to a mass ratio of fuel medium relative to intake air:

$$FAR = \frac{m_{fuel}}{m_{air}}, \quad (2)$$

wherein $m_{fuel}$ indicates a mass of fuel medium in the fuel mixture and $m_{air}$ indicates a mass of intake air in the fuel mixture.

Further, for controlling and monitoring the operation of the engine 10, the ECU receives a first input signal 40 indicative of an engine speed and a rotational phase of the crank shaft 18 provided by a crank shaft sensor 42 and a second input signal 44 indicative of a mass flow, a pressure and a temperature of intake air guided through the intake air line 24 provided by the intake air sensor 28.

Accordingly, based on the received signals 38, 40, 44, the ECU is configured to control the timing and duration of actuating the intake air valve 26, the fuel injection valve 30 and the exhaust gas valve 34, thereby properly operating the engine 10.

The basic structure and operation of such an internal combustion engine 10 is well known to a person skilled in the art and is thus not further specified. Rather, characteristics of the engine 10 and its fuel and intake air supply control device 22 interlinked with the present invention are addressed in the following.

Figure 2:
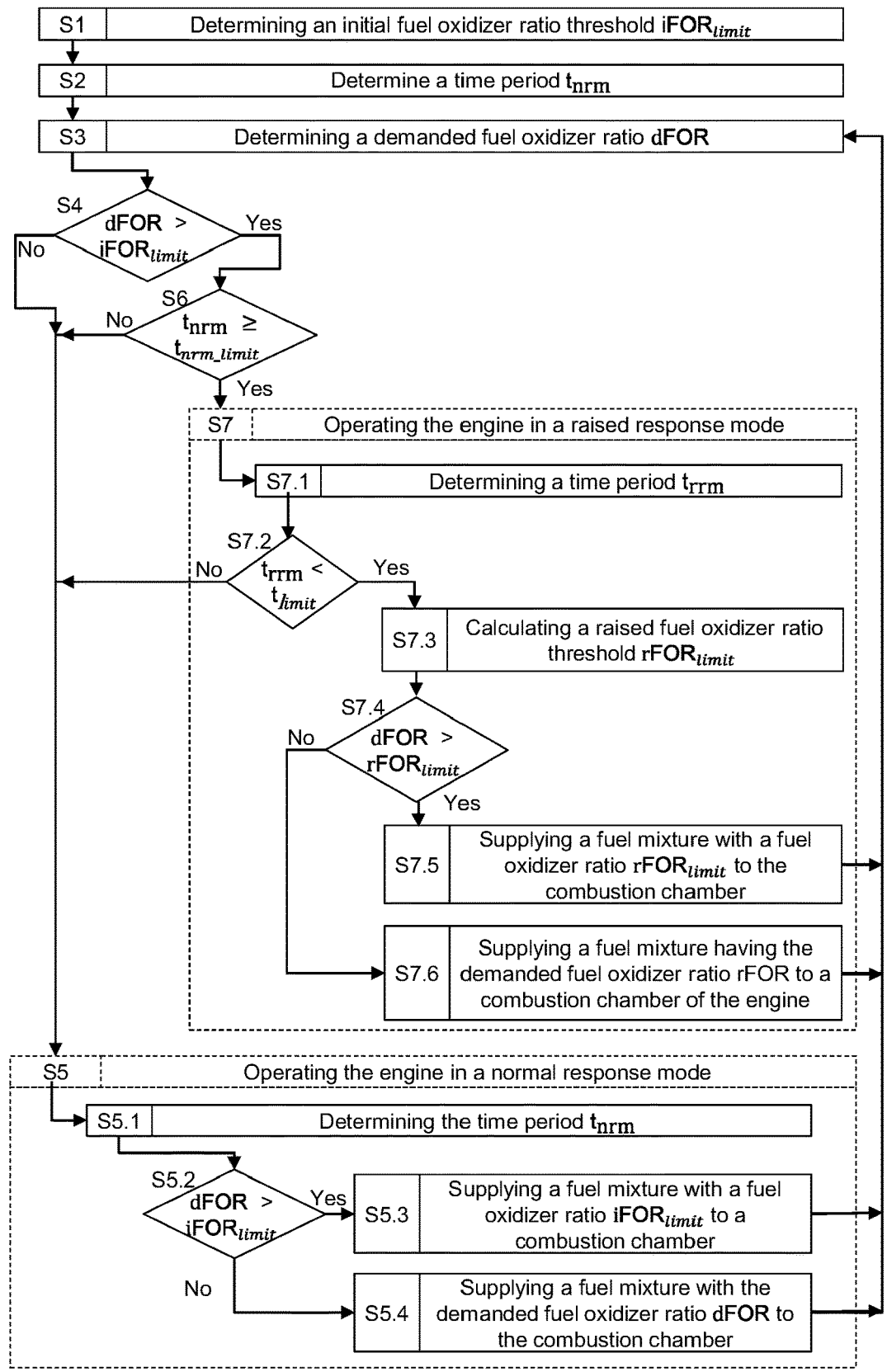
FIG. 2 shows a flow diagram schematically illustrating a method for operating the internal combustion engine depicted in FIG. 1 in a transition operating mode.

FIG. 2 depicts a flow diagram illustrating a method for controlling the engine 10 in a transition or a transient operating mode for increasing the power of the engine 10. In the context of the present disclosure, the term "transition operating mode" or the term "transient operating mode" refer to an operating mode of the engine 10 during which engine power is increased and/or during which the engine 10, i.e. engine speed is accelerated. Thus, during the transition or transient operating mode, the torque and/or rotational speed of the engine 10 are/is increased. In other words, by being operated in the transition or transient operating mode, the engine 10 is transitioned from a first operating mode, e.g. a primary or initial operating mode, to a second operating mode, e.g. a secondary operating mode, wherein in the second operating the engine 10 is operated at higher load and/or at higher engine speed compared to the first operating mode.

The method illustrated in FIG. 2 is carried out by the control device 22 of the engine 10, i.e. by the ECU thereof.

As can be gathered from FIG. 2, during the transition operating mode, the engine 10 may be operated in two different sub-modes, namely a normal response mode depicted by step S5 and a raised response mode depicted step S7.

In the normal response mode S5, the engine 10 is operated such that the fuel mixture supplied into the combustion chamber 14 has a fuel oxidizer ratio that does not exceed an initial fuel oxidizer ratio threshold $iFOR_{limit}$. In the present disclosure, the "initial fuel oxidizer ratio threshold" $iFOR_{limit}$ constitutes an overall threshold for the fuel mixture to be supplied to the combustion chamber 14 of the engine 10. This threshold is provided to the control device 22 so as to prevent the engine 10 from generating and discharging exhaust gas with an excessive amount of particulates, i.e. soot, during operation. The initial fuel oxidizer ratio threshold $iFOR_{limit}$ is set such that balanced operating conditions can be ensured during long operating times of the engine 10. Thus, when the engine 10 is operated with a fuel mixture having a fuel oxidizer ratio that equals or is less than the initial fuel oxidizer ratio threshold $iFOR_{limit}$, the configuration of the control device 22, i.e. by utilizing the particulate filter 36, ensures that an amount of particulates, i.e. soot, in the exhaust gas discharged from the engine 10, i.e. after being guided through the particulate filter 36, does not exceed a predetermined limit even during long operating times. In this way, a stable or balanced operating condition may be provided in which a mass flow of particulates, i.e. soot, removed from the exhaust gas by the particulate filter 36 equals or is lower than a mass flow of particulates, i.e. soot, burned off in the particulate filter 36.

In contrast thereto, in the raised response mode S7, the engine 10 is operated such that the fuel mixture supplied into the combustion chamber 14 may temporally have a fuel oxidizer ratio that exceeds the initial fuel oxidizer ratio threshold $iFOR_{limit}$. In other words, in the raised response mode S7, the method allows that the fuel mixture supplied into the combustion chamber 14 has a fuel oxidizer ratio which temporally, i.e. for a specified and limited period of time, may exceed the initial fuel oxidizer ratio threshold $iFOR_{limit}$. Specifically, if a demanded fuel oxidizer ratio dFOR for the fuel mixture exceeds the initial fuel oxidizer ratio threshold $iFOR_{limit}$, the engine 10 is temporally operated in the raised response mode, in which a fuel oxidizer ratio threshold is increased from the initial fuel oxidizer ratio threshold $iFOR_{limit}$ to an raised fuel oxidizer ratio threshold $rFOR_{limit}$, as can be gathered from step S7 in FIG. 2.

In this way, compared to known methods for operating an internal combustion engine, in which the fuel mixture is not allowed to exceed an overall or initial fuel oxidizer ratio threshold at all, the proposed method enables to temporally increase the amount or quantity of fuel beyond standard smoke limits. In this way, during the transition or transient operating mode, the available power of the engine may be increased. As to substance, it has been found that, during the transition or transient operating mode, the amount or quantity of intake air supplied to the engine 10 is generally limited. Thus, for increasing the available power of the engine in this operating mode, the method suggests to temporally increase the amount or quantity of fuel supplied into the combustion chamber 14 by increasing the fuel oxidizer ratio. As a result, the proposed method enables to improve a transient performance of the engine 10, particularly when the engine 10 is transitioned from a low load operation mode, such as a thermal management or economy mode, to a higher load operation mode.

Further, it has been found that for a limited first period of time a higher amount of particulates, i.e. soot, in the exhaust gas can be accepted when the engine is operated in the transition mode. As to substance, for a limited first period of time $t_{limit}$, the particulate filter 36 may be capable of properly purifying exhaust gas expelled from the combustion chamber 14 which comprises a higher amount of soot compared to exhaust gas generated during the normal response mode of the engine. In other words, although a fuel mixture with a fuel oxidizer ratio exceeding the initial threshold $iFOR_{limit}$ is ignited in the combustion chamber 14, the particulate filter 36 is capable of properly removing particulates, i.e. soot, form the thus generated exhaust gas for the limited first period of time $t_{limit}$. This means that, during the limited first period of time, the purified exhaust gas discharged from the particulate filter 36 still meets the predetermined limits, i.e.

regulatory limits, for particulates, i.e. soot, present in the exhaust gas. In other words, by limiting the time period the engine 10 can be operated with the raised fuel oxidizer ratio, the proposed method may avoid the particulate filter 36 from being filled up with soot too quickly, i.e. which may require a regeneration procedure thereof.

In this operating mode, however, a mass flow of particulates, i.e. soot, removed from exhaust gas by the particulate filter 36 may be higher than a mass flow of particulates, i.e. soot, burned off in the particulate filter 36. As a result, the amount of particulates, i.e. soot, accommodated in the particulate filter 36, steadily increases until a saturation of the particular filter 36 may be reached. However, once its saturation state is reached, the particular filter 36 may no longer ensure to properly purify the exhaust gas guided therethrough, i.e. exhaust gas comprising an increased amount of soot. Accordingly, the limited first period of time $t_{limit}$, during which the engine 10 is operated in the raised response mode, is set such as to prevent that the engine 10 is operated in the raised response mode when the particulate filter 36 has reached its saturation state.

After being operated in the raised response mode for the limited first period of time $t_{limit}$, the engine 10 is subsequently switched into the normal response mode or any other mode, during which the fuel mixture has a fuel oxidizer ratio satisfying the initial fuel oxidizer threshold $iFOR_{limit}$. In other words, the fuel oxidizer ratio threshold is decreased or reset from the raised fuel oxidizer ratio threshold $rFOR_{limit}$ to the initial fuel oxidizer ratio threshold $iFOR_{limit}$.

In this mode, the mass flow of particulates, i.e. soot, removed from the exhaust gas by the particulate filter 36 may be lower than the mass flow of particulates, i.e. soot, burned off in the particulate filter 36 so as to counteract the saturation of the particulate filter 36. In this way, the method may ensure that, although the mass flow of particulates, i.e. soot, entering the particulate filter 36 may vary during operation of the engine 10, the exhaust gas discharged from the particulate filter 36 meets the predetermined limits, i.e. regulatory limits, for particulates, i.e. soot, present in the exhaust gas.

In order to ensure that a sufficient amount of soot is burned off during this mode of operation before the engine may be operated again in the raised response mode with the raised fuel oxidizer ratio threshold $rFOR_{limit}$, the raised response mode is locked out for a predetermined second period of time $t_{nrm\_limit}$. This can be gathered from step S6 in FIG. 2, wherein the parameter $t_{nrm}$ refers to a time period the engine 10 is being continuously operated in compliance with the initial fuel oxidizer ratio threshold $iFOR_{limit}$. In other words, prior to being allowed to switch the engine to the raised response mode, at first, the engine has to be operated in the normal response mode or any other mode provided with the initial fuel oxidizer ratio threshold $iFOR_{limit}$ at least for the predetermined second period of time $t_{nrm\_limit}$. The predetermined second period of time $t_{nrm\_limit}$ may be set in dependence on the configuration of the particulate filter 36. Further, the predetermined second period of time $t_{nrm\_limit}$ may be set in dependence on a control parameter $t_{rrm}$ which indicates a time period the engine 10 has been continuously, i.e. without interruption, operated in the raised response mode prior to being switched into the current mode, i.e. the normal response mode. The higher the value of the control parameter $t_{rrm}$ the higher the predetermined second period of time $t_{nrm\_limit}$ may be set.

In the following, the method is described step by step and in more detail by reference to FIG. 2.

In a first step S1, the initial fuel oxidizer ratio threshold $iFOR_{limit}$ for the fuel mixture to be supplied to the combustion chamber 14 of the engine 10 is determined. The initial fuel oxidizer ratio threshold $iFOR_{limit}$ may depend on, inter alia, the configuration and capacity of the particulate filter 36. Further, the initial fuel oxidizer ratio threshold $iFOR_{limit}$ may be stored in a memory unit within the ECU, such as a ROM or RAM, which can be read out by the ECU, i.e. a CPU thereof.

Thereafter, in step S2, the control parameter $t_{nrm}$ is initially determined. As set forth above, the parameter $t_{nrm}$ refers to a time period the engine 10 is being continuously operated in compliance with the initial fuel oxidizer ratio threshold $iFOR_{limit}$. Thus, starting from a current point of time, the parameter $t_{nrm}$ indicates a time period the engine 10 is being continuously, i.e. without interruption, operated with a fuel mixture having a fuel oxidizer ratio which satisfies the initial fuel oxidizer ratio threshold $iFOR_{limit}$. For determining the parameter $t_{nrm}$, the control device 22, i.e. the ECU, may comprise a timer unit.

In a third step S3, a demanded fuel oxidizer ratio dFOR of the fuel mixture to be supplied to the combustion chamber 14 of the engine 10 is determined. The determination of the demanded fuel oxidizer ratio dFOR is performed by the ECU based on the input signal 38.

The ECU then determines in step S4 whether or not the demanded fuel oxidizer ratio dFOR is greater than the initial fuel oxidizer ratio threshold $iFOR_{limit}$. As long as the demanded fuel oxidizer ratio dFOR equals or is lower than the initial fuel oxidizer ratio threshold $iFOR_{limit}$, the method proceeds to step S5 for operating the engine 10 in the normal response mode.

More specifically, when being operated in the normal response mode S5, the time period $t_{nrm}$ is determined which indicates the duration the engine 10 is being continuously operated in compliance with the initial fuel oxidizer ratio threshold $iFOR_{limit}$, i.e. in the normal response mode. Thereafter, in step S5.2, the ECU determines whether or not the demanded fuel oxidizer ratio dFOR exceeds the initial fuel oxidizer ratio threshold $iFOR_{limit}$. If the demanded fuel oxidizer ratio dFOR exceeds the initial fuel oxidizer ratio threshold $iFOR_{limit}$, the method proceeds to step S5.3, in which the ECU controls the control device 22 such that a fuel mixture is supplied into the at least one combustion chamber 14 which has a fuel oxidizer ratio that equals the initial fuel oxidizer ratio threshold $iFOR_{limit}$. But, if the demanded fuel oxidizer ratio dFOR does not exceed the determined initial fuel oxidizer ratio threshold $iFOR_{limit}$, the method proceeds to step S5.4, in which the ECU controls the control device 22 such that a fuel mixture is supplied into the at least one combustion chamber 14 which has a fuel oxidizer ratio that equals the demanded fuel oxidizer ratio dFOR.

However, when the ECU in step S4 determines that the demanded fuel oxidizer ratio dFOR exceeds the initial fuel oxidizer ratio threshold $iFOR_{limit}$, the method proceeds to step S6.

In step S6, the ECU determines whether or not the determined parameter $t_{nrm}$ equals or is greater than the previously mentioned predetermined second period of time $t_{nrm\_limit}$. As long as the parameter $t_{nrm}$ is lower that the predetermined second period of time $t_{nrm\_limit}$, the method proceeds to step S5 for operating the engine 10 in the normal response mode. However, when the parameter $t_{nrm}$ equals or is greater than the predetermined second period of time $t_{nrm\_limit}$ the method proceeds to step S7 for operating the engine 10 in the raised response mode. Again, by providing step S6, the method ensures that the particulate filter 36 has been sufficiently regenerated during a time period the engine 10 has been operated in compliance with the initial fuel oxidizer ratio threshold $iFOR_{limit}$, i.e. in the normal response mode. More specifically, in this way, the method ensures that, e.g. in the normal response mode, particulates, i.e. soot, accumulated in the particulate filter 36 are removed so as to provide a sufficient buffer that is to be filled by particulates during the raised response mode.

In the following, the raised response mode S7 of the engine 10 is further specified. At first, in step S7.1, the parameter $t_{rrm}$ is determined which indicates a time period the engine 10 is being continuously, i.e. without interruption, operated in the raised response mode. This may be performed by means of the timer unit of the control device 22, which may be comprised in the ECU.

Then, in step 7.2, the ECU determines whether or not the parameter $t_{rrm}$ has reached the first limited period of time $t_{limit}$ which, as set forth above, corresponds to the limited period of time, during which the engine 10 can be operated in the raised response mode.

As long as the parameter $t_{rrm}$ has not reached the limited first period of time $t_{limit}$, as can be gathered from step S6, and as long as the demanded fuel oxidizer ratio dFOR exceeds the initial fuel oxidizer ratio threshold $iFOR_{limit}$, as can be gathered from step S4, the engine 10 is operated in the raised response mode. However, when the parameter $t_{rrm}$ equals or is greater than the limited first period of time $t_{limit}$ and/or when demanded fuel oxidizer ratio dFOR equals or is lower than the initial fuel oxidizer ratio threshold $iFOR_{limit}$, the engine 10 is operated in the normal response mode S5. By providing method step S7.2, the method ensures that the engine 10 is temporally operated in the raised response mode for the limited first period of time $t_{limit}$. Further, after being operated in the raised response mode for the limited first period of time $t_{limit}$, the engine 10 is subsequently operated in the normal response mode in which the fuel oxidizer ratio threshold equals the initial fuel oxidizer ratio threshold $iFOR_{limit}$, as can be gathered from steps S5.2 to S5.4 in FIG. 2.

As depicted in FIG. 2, when the parameter $t_{rrm}$ is lower than the limited first period of time $t_{limit}$, the method proceeds to step S7.3, in which the raised fuel oxidizer ratio threshold $iFOR_{limit}$ is calculated. Specifically, the raised fuel oxidizer ratio threshold $rFOR_{limit}$ may be calculated in dependence on an engine performance parameter pp. In the context of the present disclosure, the term "engine performance parameter" refers to any parameter indicating a current operating state and/or quantifying a current performance of the engine 10. For example, the raised fuel oxidizer ratio threshold $rFOR_{limit}$ may be calculated in dependence on an engine speed and/or an engine torque and/or a fuel injection amount or quantity, i.e. per injection cycle. The engine performance parameter pp may be determined by respective sensors of the control device 22 which are connected to the ECU so as to transfer the thus determined value thereto.

Specifically, the step of calculating the raised fuel oxidizer ratio threshold $rFOR_{limit}$ may be performed by multiplying the initial fuel oxidizer ratio threshold $iFOR_{limit}$ with a correction parameter c or by adding the correction parameter c to the initial fuel oxidizer ratio threshold $iFOR_{limit}$ wherein the correction parameter c is set in dependence on or depends on the engine performance parameter pp. For example, for providing the correction parameter c, a function c(pp) may be provided, i.e. to the memory unit of the ECU, which, in dependence on the engine performance parameter pp, determines the correction parameter c for calculating the raised fuel oxidizer ratio threshold $rFOR_{limit}$. Alternatively or additionally, an array, a table or a matrix may be provided, i.e. to the memory unit of the ECU, in which values for the correction parameter c are correlated to specific values or ranges of the at least one engine performance parameter pp. In this way, the ECU is enabled to select a proper correction parameter c in dependence of a current engine performance parameter pp.

In step S7.4, the ECU determines whether or not the demanded fuel oxidizer ratio dFOR exceeds the determined raised fuel oxidizer ratio threshold $rFOR_{limit}$. If the demanded fuel oxidizer ratio dFOR exceeds the determined raised fuel oxidizer ratio threshold $rFOR_{limit}$, the method proceeds to step S7.5, in which the ECU controls the control device 22 such that a fuel mixture is supplied into the at least one combustion chamber 14 which has a fuel oxidizer ratio that equals the raised fuel oxidizer ratio threshold $rFOR_{limit}$. However, if the demanded fuel oxidizer ratio dFOR does not exceed the determined raised fuel oxidizer ratio threshold $rFOR_{limit}$, the method proceeds to step S7.6, in which the ECU controls the control device 22 such that a fuel mixture is supplied into the at least one combustion chamber 14 which has a fuel oxidizer ratio that equals the demanded fuel oxidizer ratio dFOR.

As can be gathered form FIG. 2, after carrying out steps S5.3, S5.4, S7.5 and S7.6, respectively, the method returns to step S3. Thus, the steps S3 to any one of steps S5.3, S5.4, S7.5 and S7.6 are repeatedly carried out during the method. Preferably, these steps may be run in dependence of a cycle time of the engine 10, i.e. the respective cylinder 12. For example, during each cycle time, the method may run step S3 to any one of steps S5.3, S5.4, S7.5 and S7.6.

In a further development, i.e. in case the composition and relative amount of components of the intake air maintains constant or substantially constant, during operation of the engine 10, the proposed method, in general, may refer to a fuel air ratio FAR instead of a fuel oxidizer ratio FOR. Accordingly, in the method, an initial fuel air ratio threshold $iFAR_{limit}$ instead of an initial fuel oxidizer ratio threshold $iFOR_{limit}$, a demanded fuel air ratio dFAR instead of an demanded fuel oxidizer ratio dFOR, a raised fuel air ratio threshold $rFAR_{limit}$ instead of a raised fuel oxidizer ratio threshold $rFOR_{limit}$, etc. may be referred to and calculated.

Furthermore, the engine 10 may be provided in the form of an exhaust gas recirculation engine. In this configuration, the control device may comprise an exhaust turbocharger having a compressor through which the intake air is guided upon flowing through the intake air line 24. The compressor may be connected to an exhaust turbine of the exhaust turbocharger in a force-transmitting manner, through which exhaust gas expelled from the combustion chamber 14 is guided upon flowing through the exhaust gas line 32, i.e. upstream of the particulate filter 36. After and/or before passing the exhaust turbine, the exhaust gas, at least partially, may be recirculated into the intake air line 24, wherein the amount of recirculating exhaust gas flowing into the intake air line 24 may be adjusted by the control device 22, i.e. by means of an exhaust gas recirculation valve for adjusting the amount of exhaust gas flowing into the intake air line 24 and by means of a throttle valve for adjusting the amount of fresh intake air guided into the intake air line 24. In this configuration, the ECU may be configured to determine an amount of oxidizer, i.e. oxygen, present in the intake air supplied into the at least one combustion chamber 14. For doing so, the control device 22 may comprise sensors for determining a mass flow of fresh intake air supplied into the intake air line 24 and for determining a mass flow of exhaust gas recirculated into the intake air line 24. Based thereupon, the ECU may estimate or determine the amount of oxidizer, i.e. oxygen, present in the intake air supplied into the at least one combustion chamber 14.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

A method for operating an internal combustion engine in a transition operating mode may be provided. The method may comprise a step of determining an initial fuel oxidizer ratio threshold for a fuel mixture to be supplied to a combustion chamber of the engine and a step of determining a demanded fuel oxidizer ratio of the fuel mixture to be supplied to the combustion chamber of the engine. In the method, if the demanded fuel oxidizer ratio exceeds the initial fuel oxidizer ratio threshold, the engine may temporally be operated in a raised response mode, in which a fuel oxidizer ratio threshold is increased from the initial fuel oxidizer ratio threshold to a raised fuel oxidizer ratio threshold, and supplying a fuel mixture having the demanded fuel oxidizer ratio into the combustion chamber of the engine.

Compared to known methods for operating an internal combustion engine, in which the fuel mixture is not allowed to exceed an overall or initial fuel oxidizer ratio threshold at all, the proposed method, i.e. by providing the raised response mode, enables to temporally increase a maximum output power of the engine. As a result, the method enables to increase an engine power level in short response times, particularly when the engine is transitioned from a low load operation mode, such as a thermal management or economy mode, to a higher load operation mode.

The method may be use for operating any kind of internal combustion engines.

For example, the method may be used for operating reciprocating internal combustion engines, such as compression-ignition engines, e.g. diesel engines, or spark-ignition engines, e.g. two-stroke engines. Also, the method may be used for operating gas turbines. Such internal combustion engines may be used as drive engines, i.e. in vehicles. Alternatively, such internal combustion engines may be used as main or auxiliary engines of stationary power providing systems such as power plants for production of heat and/or electricity as well as in ships/vessels such as cruiser liners, cargo ships, container ships, and tankers. Fuels for internal combustion engines may include gaseous fuel, diesel oil, marine diesel oil, heavy fuel oil, alternative fuels or a mixture thereof.

In the method, the engine may be operated in the raised response mode for a predefined first period of time. Further, the method may be provided such that, after being operated in the raised response mode, the engine is subsequently switched to a normal response mode in which the fuel oxidizer ratio threshold is decreased or reset from the raised fuel oxidizer ratio threshold to the initial fuel oxidizer ratio threshold. In other words, the engine is operated in the normal response mode directly after being operated in the raised response mode.

The engine may be operated in the normal response mode for at least a predefined second period of time, i.e. before being operated in the raised response mode again. In other words, for this predefined second period of time, the engine is locked out from being operated in the raised response mode. Specifically, the predefined second period of time may be set in dependence on a time period the engine has being continuously operated in the raised response mode prior to being switched into the normal response mode.

In a further development, the method may further comprise a step of calculating the raised fuel oxidizer ratio threshold in dependence on an engine performance parameter. This step may be performed within the raised response mode or before the engine is switched to the raised response mode. The engine performance parameter may indicate or quantify a current engine performance. For example, the engine performance parameter may comprise at least one of a current engine speed, a current engine torque and a current fuel injection amount or quantity of the engine.

Specifically, the step of calculating the raised fuel oxidizer ratio threshold may be performed by multiplying the initial fuel oxidizer ratio threshold with a correction parameter. Alternatively, the correction parameter may be added to the initial fuel oxidizer ratio threshold.

The correction parameter may be set in dependence on the at least one engine performance parameter. Specifically, in the step of calculating the raised fuel oxidizer ratio threshold, the correction parameter may be set or determined based on a function which determines the correction parameter in dependence of the at least one engine performance parameter. Accordingly, the at least one engine performance parameter may constitute an input parameter for the function. Alternatively or additionally, in the step of calculating the raised fuel oxidizer ratio threshold, the correction parameter may be set or determined based on an array and/or a table and/or any other data set, in which values for the correction parameter are correlated to specific values or ranges of the at least one engine performance parameter.

Furthermore, a fuel and intake air supply control device for an internal combustion engine may be provided which may be configured to control a supply of a fuel mixture into a combustion chamber of the engine. The fuel and intake air supply control device may comprise a first means for determining an initial fuel oxidizer ratio threshold for a fuel mixture to be supplied to a combustion chamber of the engine, and a second means for determining a demanded fuel oxidizer ratio of the fuel mixture to be supplied to the combustion chamber of the engine. Further, the fuel and intake air supply control device may be configured to, if the demanded fuel air oxidizer exceeds the initial fuel oxidizer ratio threshold, temporally operate the engine in a raised response mode, in which a fuel oxidizer ratio threshold is increased from the initial fuel oxidizer ratio threshold to a raised fuel oxidizer ratio threshold, and to supply a fuel mixture having the demanded fuel oxidizer ratio into the combustion chamber of the engine. The first and the second means may be provided in an electronic control unit.

INDUSTRIAL APPLICABILITY

With reference to the Figures, a method for operating an internal combustion engine 10 is proposed. The method as mentioned above is applicable in internal combustion engines which may be used as drive engines, i.e. in vehicles, or as main or auxiliary engines of stationary power providing systems such as power plants for production of heat and/or electricity as well as in ships/vessels such as cruiser liners, cargo ships, container ships, and tankers.

The invention claimed is:

1. A method for operating an internal combustion engine in a transition operating mode, the engine configured to receive a fuel mixture in a combustion chamber, the fuel mixture comprising a fuel medium and an intake air, the intake air including an oxidizer, the fuel medium having a mass, the oxidizer having a mass, the fuel mixture received by the engine having a fuel oxidizer ratio, the method comprising the steps of:

setting a threshold for the fuel oxidizer ratio of the fuel mixture, the threshold equal to an initial threshold ($iFOR_{limit}$) the $IFOR_{limit}$ a value at which an amount of particulates in an exhaust gas discharged from the engine does not exceed a predetermined particulate limit when the fuel oxidizer ratio does not exceed the $IFOR_{limit}$;

determining a demanded fuel oxidizer ratio (dFOR) of the fuel mixture to be supplied to the combustion chamber of the engine;

if the demanded fuel oxidizer ratio (dFOR) exceeds the initial threshold ($iFOR_{limit}$) while the engine is transitioning from operating at a first engine power to operating at a second engine power that is greater than the first engine power, temporally operating the engine in a raised response mode, in which the threshold for the fuel oxidizer ratio of the fuel mixture is increased from the initial threshold ($iFOR_{limit}$) to a raised fuel oxidizer ratio threshold ($rFOR_{limit}$) up to a first period of time ($t_{limit}$), and supplying the fuel mixture at the demanded fuel oxidizer ratio (dFOR) into the combustion chamber of the engine, wherein during $t_{limit}$ the amount of particulates in an exhaust gas discharged from the engine does not exceed the predetermined particulate limit associated with the $IFOR_{limit}$, wherein the fuel oxidizer ratio is a ratio of the mass of the fuel medium in the fuel mixture to the mass of the oxidizer in the fuel mixture, wherein the oxidizer is oxygen, wherein further the mass of the oxidizer is less than a mass of the intake air.

2. The method according to claim 1, wherein the engine, after being operated in the raised response mode, is subsequently switched to a normal response mode in which the threshold for the fuel oxidizer ratio is decreased from the raised fuel oxidizer ratio threshold ($rFOR_{limit}$) to the initial fuel oxidizer ratio threshold ($iFOR_{limit}$).

3. The method according to claim 2, wherein the engine is operated in the normal response mode for at least a predefined second period of time ($t_{nrm\ limit}$).

4. The method according to claim 3, wherein the further predefined period of time ($t_{nrm\ limit}$) is set in dependence on a time period ($t_{rrm}$) the engine has being continuously operated in the raised response mode prior to being switched to the normal response mode.

5. The method according to claim 1, wherein the method further comprises a step of calculating the raised fuel oxidizer ratio threshold ($rFOR_{limit}$) in dependence on an engine performance parameter.

6. The method according to claim 5, wherein the engine power performance comprises at least one of a current engine speed, a current engine torque and a current fuel injection amount or fuel injection quantity.

7. The method according to claim 5, wherein the step of calculating the raised threshold ($rFOR_{limit}$) is performed by multiplying the initial threshold ($iFOR_{limit}$) with a correction parameter, wherein the correction parameter is set in dependence on at least one engine performance parameter.

8. The method according to claim 7, wherein in the step of calculating the raised fuel oxidizer ratio threshold ($rFOR_{limit}$), the correction parameter is set based on a data set in the form of a table, in which values for the correction parameter are correlated to specific values or ranges of the at least one engine performance parameter.

9. A fuel and intake air supply control device for an internal combustion engine configured to control a supply of a fuel mixture into a combustion chamber of the engine, the fuel mixture comprising a fuel medium and an intake air, the intake air including an oxidizer, the fuel medium having a mass, the oxidizer having a mass, the fuel mixture received by the engine having a fuel oxidizer ratio, the fuel and intake air supply control device comprising:

a first means for setting a threshold for the fuel oxidizer ratio of the fuel mixture, the threshold equal to an initial fuel oxidizer ratio threshold ($iFOR_{limit}$), the $iFOR_{limit}$ a value at which an amount of particulates in an exhaust gas discharged from the engine does not exceed a predetermined particulate limit when the fuel oxidizer ratio does not exceed the $iFOR_{limit}$; and a second means for determining a demanded fuel oxidizer ratio (dFOR) of the fuel mixture to be supplied to the combustion chamber of the engine, wherein the fuel and intake air supply control device is configured to, if the demanded fuel air oxidizer (dFOR) exceeds the initial threshold ($iFOR_{limit}$) while the engine is transitioning from operating at a first engine power to operating at a second engine power that is greater than the first engine power, temporally operate the engine in a raised response mode, in which the threshold for the fuel oxidizer ratio of the fuel mixture is increased from the initial fuel oxidizer ratio threshold ($iFOR_{limit}$) to a raised fuel oxidizer ratio threshold ($rFOR_{limit}$) up to a first period of time ($t_{limit}$), and to supply the fuel mixture at the demanded fuel oxidizer ratio (dFOR) into the combustion chamber of the engine, wherein during $t_{limit}$ the amount of particulates in an exhaust gas discharged from the engine does not exceed the predetermined particulate limit associated with the $iFOR_{limit}$, wherein the fuel oxidizer ratio is a ratio of the mass of the fuel medium in the fuel mixture to the mass of the oxidizer in the fuel mixture, wherein the oxidizer is oxygen, wherein further the mass of the oxidizer is less than a mass of the intake air.

* * * * *